Oct. 12, 1948.  V. R. PAOLUCCI  2,451,407
VEHICLE ATTACHED JACK OPERATED FROM LUGGAGE COMPARTMENT
Filed April 27, 1945

INVENTOR.
VINCENT R. PAOLUCCI
BY
*Kwis Hudson Boughton & Williams*
ATTORNEYS

Patented Oct. 12, 1948

2,451,407

UNITED STATES PATENT OFFICE 2,451,407

VEHICLE ATTACHED JACK OPERATED FROM LUGGAGE COMPARTMENT

Vincent R. Paolucci, Cleveland Heights, Ohio

Application April 27, 1945, Serial No. 590,596

3 Claims. (Cl. 254—86)

The present invention relates to an automobile jack adapted to be permanently attached to an automobile and, more particularly, to an automobile having a jack permanently attached thereto.

With the use of conventional jacks, it is very difficult to raise the wheels of an automobile for the purpose of changing tires, etc., and it is particularly difficult to raise the rear wheels when they are in a depression which must be filled or have some non-skid substance, such as, carpet or burlap or the like inserted therein underneath the wheel or wheels before the automobile can be moved. Under the last-mentioned circumstances, the raising of the wheels is particularly difficult because the axle and other parts of the automobile are abnormally close to the ground due to the depression in which the wheel or wheels are resting.

With the foregoing in mind, the principal object of the present invention is the provision of an automobile jack which is or is adapted to be attached to the body or frame of an automobile as a permanent fixture with the operating mechanism accessible through the rear trunk or luggage compartment of the automobile.

Figure 1:
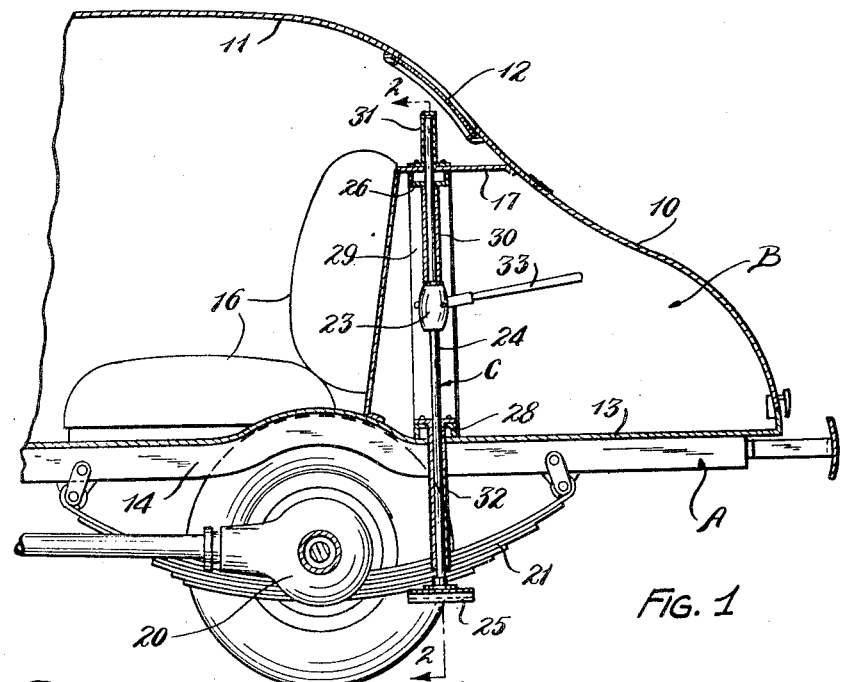
Figure 2:
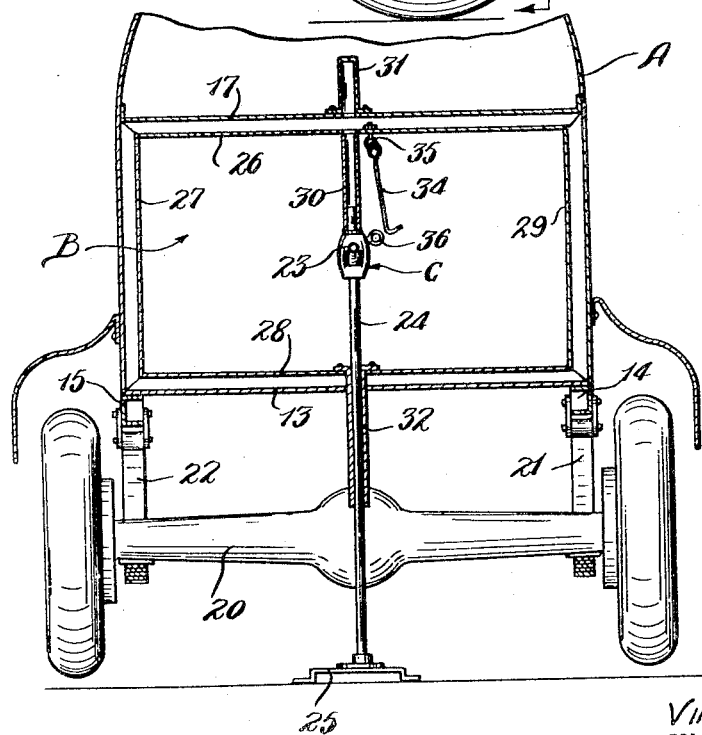

The present invention resides in certain novel constructions and combinations and arrangements of parts and further objects and advantages thereof will be apparent to those skilled in the art to which it relates from the following description of the preferred embodiment described with reference to the accompanying drawings forming a part of this specification, in which Fig. 1 is a fragmentary longitudinal sectional view through the rear part of an automobile embodying the present invention; and Fig. 2 is a fragmentary sectional view of the automobile shown in Fig. 1 taken approximately on the line 2—2.

Referring to the drawings wherein the showing of the automobile is merely diagrammatical, the reference character A designates generally the frame or body of an automobile of conventional construction, which frame comprises a trunk or luggage compartment B accessible through a movable closure member or cover 10 hinged to the rear top panel 11 having a rear view window 12 therein, a floor 13 extending between the side frame members 14, 15, a seat 16, and a ledge 17 extending between the rear of the seat 16 and the panel member 11. In addition to the parts referred to, the automobile includes a rear axle assembly 20 to which the body or frame is connected by springs 21, 22.

A jack assembly, designated generally by the reference character C and of any conventional type, that is, friction, screw, ratchet, etc., is located in the longitudinal centerline of the automobile behind the axle assembly 20. The particular jack mechanism shown is of the frictional type and comprises two relatively movable members 23, 24, the former of which is operatively connected to any suitable part of the frame or body A by fixedly securing it thereto or by allowing it to abut a portion thereof, while the latter, which is in the form of a rod or bar, extends downwardly through a suitable aperture in the floor 13 of the trunk or luggage compartment B and is provided at its lower end with a relatively large ground-engaging member 25. As shown, the member 23 is operatively connected to the ledge 17, which ledge is reinforced for this purpose by a rectangular member formed of welded channels 26, 27, 28 and 29, the lower channel 28 of which extends above the floor 13 of the compartment B. Alternatively, the member 23 may be connected to a ground-engaging member and the member 24 connected to the frame A.

Referring again to the drawings, the upper end of the member 23 is adapted to abut the lower end of a sleeve member 30, surrounding the upper end of the member or rod 24, and the upper end of the sleeve 30 is secured to the underside of the top channel member 26 by any suitable means such as welding or the like. The upper channel member 26 and the ledge 17 are provided with apertures, aligned with the hollow interior of the sleeve 30, through which the upper end of the member 24 may project so that the member 24 can be raised as far as possible when the jack is not being used to lift the automobile. Preferably, the upper end of the rod 24 when so raised, is enclosed within a tubular housing 31 attached to the upper side of the ledge 17 in any convenient manner. The lower end of the member 24 extends through a tubular housing 32 projecting downwardly through the lower channel member 28 and the floor 13. The upper end of the housing 32 is provided with a flange through the medium of which it is supported from the upper surface of the lower channel 28.

As previously stated, the operating mechanism of the jack mechanism C may be of any conventional construction and is not herein shown or described in detail. Suffice it to say that upon reciprocation of the handle 33, which handle is accessible through the closure 10, the member or rod 24 is moved downwardly with reference to the member 23 and the body of the automobile until the member 25 engages the ground. Continued movement of the operating handle 33 raises the member 23 until the latter abuts the sleeve 30 and thereafter not only the member 23 and the sleeve 30 but also the automobile are raised relative to the rod or member 24. The member 25 is comparatively wide and is non-rockably mounted on the member 24 so that no difficulty will be encountered in raising both rear wheels of the automobile with the single jack shown, however, two jacks may be employed, if desired. In this event, the jacks are located on opposite sides of the longitudinal centerline of the car.

When it is desired to lower the automobile, the jack is manipulated to release the frictional engagement between the members 23, 24. After the weight of the car is removed from the jack, the member 23 is moved downwardly along the member 24 until it is adjacent to the floor of the compartment B. Thereafter, the jack assembly can be raised, by hand, as a unit to the position shown in Fig. 1 and secured in said position in some convenient manner as by the hook 34, the upper end of which is connected to a ring or eye 35 fixed in the upper channel 26 and the lower end of which is adapted to be detachably engaged within a ring or eye 36 formed integral with or fixedly secured to the member 23. If desired, the sleeve 30 may be fixedly secured to the member 23 and some provision made for raising the member 24 so that the member 25 will be clear of the ground, such as, a spring connected to the member 24 and some part of the body or frame A.

Attention is directed to the fact that the jack is located at the rear of the axle assembly 20 and lifts the body and, in turn, the axle assembly. The fact that the jack does not operate directly on the axle assembly is of particular advantage because its location longitudinally of the automobile may be varied, as desired, independently of the axle assembly. In the embodiment shown, the rear part of the seat 16 is located above the axle assembly, which construction would be impossible if the jack proper acted directly upon the axle assembly as distinguished from the frame of the automobile.

The member 23 is shown as being operatively connected to the ledge 17 but it may be fixedly connected to the floor 13 or lower channel member 28 by substituting for the tubular member 32, a tubular member long enough to be welded to the lower end of the member 23, which tubular member may be welded intermediate its ends to the lower channel member 28. The upper side of the member 23 may also be connected to the ledge 17 by one or more diagonal braces to help steady the member 23. Alternatively, the tubular member or sleeve 30 may be omitted and the member 23 fixed directly to the floor of the compartment B.

From the foregoing description of the preferred embodiments of the invention, it will be apparent that the objects heretofore enumerated and others have been accomplished and that there has been provided an improved automobile comprising means for lifting the rear end thereof, which means is accessible through the trunk compartment and can be operated without the necessity of the operator getting dirty, etc. While the preferred embodiment of the invention has been shown and described in considerable detail, the invention is not limited to the particular construction shown but may be otherwise incorporated and it is my intention to hereby cover all adaptations, modifications and uses thereof which come within the practice of those skilled in the art to which the invention relates and within the spirit and scope of the appended claims.

Having thus described my invention, what I claim is:

1. In a motor-driven vehicle, a frame having spaced side members, a body secured to said frame, reenforcing means attached to said spaced side members of the frame adjacent one end of the latter and extending transversely thereof, a vertically extending elongated hollow member attached to said reenforcing means at substantially the mid-point of the latter, and a jack mechanism including two relatively movable members one of which is elongated and disposed in said hollow member with a sliding fit and the other of which is operatively connected to said reenforcing means, non-rockable means on the lower end of said elongated movable member adapted to engage the ground, and manually operable mechanism disposed within the confines of said body and adapted to be actuated through an opening in the latter to produce relative movement between said relatively movable members.

2. In a motor-driven vehicle including a frame having a body attached thereto and provided with a luggage compartment, the combination of a reenforcing means within said luggage compartment extending transversely thereof and attached to said frame, an elongated vertically extending hollow member attached to said reenforcing means at substantially the mid-point of the latter, and a jack mechanism including two relatively movable members one of which is elongated and disposed in said hollow member with a sliding fit and the other of which is operatively connected to said reenforcing means, the said elongated movable member extending through an opening in said luggage compartment and being provided with non-rockable means on its lower end adapted to engage the ground, and manually operable mechanism disposed within the confines of said luggage compartment and adapted to be actuated through an opening in the latter to produce relative movement between said relatively movable members.

3. In a motor-driven vehicle including a frame having a body attached thereto, the combination of a rectangular reenforcing means attached to said frame adjacent to an end thereof and extending transversely thereof and vertically upward therefrom within the confines of said body, the said reenforcing means comprising a pair of spaced horizontally extending members the lower of which is attached to said frame and the upper of which is attached to said lower member by spaced vertically extending members, elongated hollow guide members connected to said horizontally extending members in vertical alignment and spaced relationship, a jack mechanism including a vertically movable member and operating mechanism therefor, means on said movable member of the jack mechanism adapted to engage the ground, the said movable member of the jack mechanism being disposed within said hollow members with a sliding fit and the said operating mechanism engaging an end of one of said hollow members and adapted to be actuated from a point exteriorly of said body by an instrument inserted through an opening therein.

VINCENT R. PAOLUCCI.

REFERENCES CITED

The following references are of record in the file of this patent:

UNITED STATES PATENTS

| Number | Name | Date |
| --- | --- | --- |
| 1,323,997 | Anderson | Dec. 2, 1919 |
| 2,234,220 | Antonletti | Mar. 11, 1941 |
| 2,241,877 | Contrino | May 13, 1941 |